(No Model.)

C. CHALLINOR, Jr.
MANUFACTURE OF OPEN ENDED GLASSWARE.

No. 275,996. Patented Apr. 17, 1883.

Witnesses:—
John M. Patterson.
G. Smith.

Charles Challinor Jr
by Connolly Bros & McTighe
Attorneys

N. PETERS, Photo-Lithographer, Washington, D. C.

UNITED STATES PATENT OFFICE.

CHARLES CHALLINOR, JR., OF PITTSBURG, PENNSYLVANIA.

MANUFACTURE OF OPEN-ENDED GLASSWARE.

SPECIFICATION forming part of Letters Patent No. 275,996, dated April 17, 1883.

Application filed June 7, 1882. (No model.)

*To all whom it may concern:*

Be it known that I, CHARLES CHALLINOR, Jr., of Pittsburg, in the county of Allegheny and State of Pennsylvania, have invented certain new and useful Improvements in the Manufacture of Open-Ended Glassware; and I do hereby declare that the following is a full, clear, and exact description of the invention, which will enable others skilled in the art to which it appertains to make and use the same, reference being had to the accompanying drawings, which form a part of this specification, in which—

Figure 1:
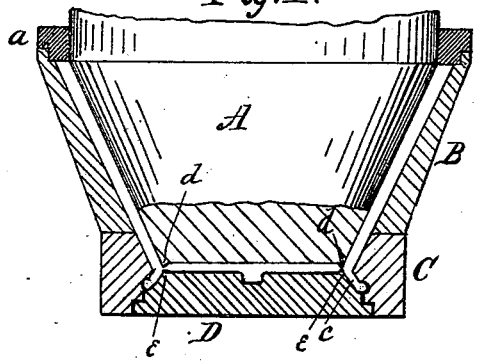
Figure 2:
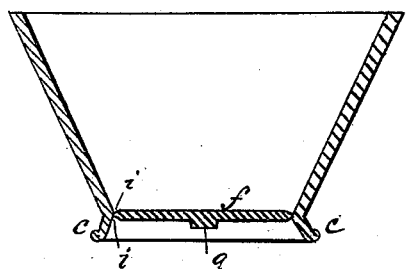
Figure 3:
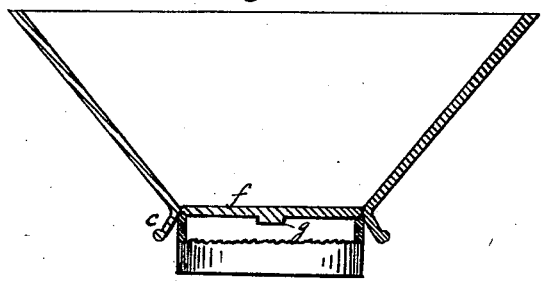
Figure 4:
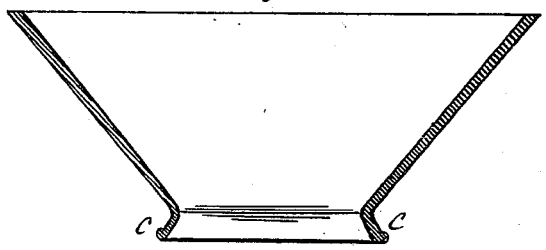
Figure 5:
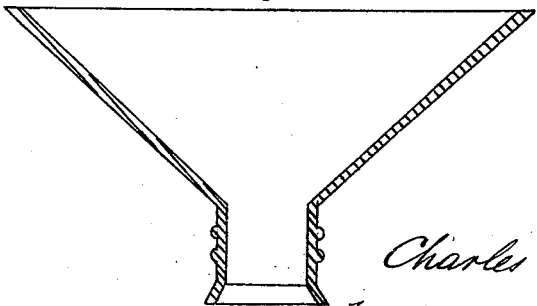

Figure 1 is a sectional elevation of my mold. Fig. 2 is a similar view of a lamp-shade blank made in the mold, Fig. 1. Fig. 3 illustrates one mode of cutting out the temporary head, and Fig. 4 is the complete and finished shade inverted. Fig. 5 is a similar view of a ring-top Argand shade.

This invention has for its object a new process and apparatus for the manufacture of open-ended glassware—that is, articles of a cylindrical or quasi-cylindrical, bell-shaped, or similar form with both ends open. The invention has, however, especial reference to the production of gas globes and shades or lamp-shades.

The invention consists in pressing in a mold a body of glass having one end open and the other closed by a temporary head or partition of glass, crossing just inside the end, the plunger and mold forming at the edge of such head or partition a groove or annulus of thin glass, which is afterward removed by suitable means; further, in the various steps and apparatus hereinafter fully described and claimed.

The invention having especial reference, as stated, to the production of glass shades, I will confine my description to such.

In the drawings, A designates a plunger having its end tapering and surrounded by the usual ring, *a*. Plunger A enters the cavity of a mold, B, of about corresponding taper. The mold, at its lower end, is made into a two-part or open-and-shut section, C, which is shaped to form the lip *c* or outwardly-curved flange, which constitutes the top of the shade when completed. The bottom plate, D, enters the section C and projects upwardly in a tapered form, so as to shape the interior of the lip *c*. The bottom of plunger A has the comparatively sharp rim *d*, projecting downwardly, and the top of the plate D is provided with the upwardly-projecting rim *e*, both arranged as shown, so that when the plunger comes down fully the two rims nearly meet through the glass. The mold being arranged as in Fig. 1, a lump of molten glass is dropped in, and the plunger is brought down forcibly, compelling the glass to fill all the open spaces of the mold, and producing a blank of the form shown at Fig. 2. In this blank the lip *c* is complete; but the body requires to be reheated and expanded into the finished shade, which may be a tapered shade, as shown by Fig. 4, or a bell-shaped shade. In this shaping up from the blank, the partition *f*, formed in pressing, serves to strengthen the body and support the lip against becoming distorted or warped by the reheating required. To reheat, the blank is either caught in a snap around the lip *c* or is stuck on a punty by the boss *g*, which is formed on the partition *f* in pressing. After the blank has been expanded to the finished form, which may be done in the usual well-known manner by means of the bench and tools, the partition *f* is removed. This may be done by scoring the surface at the groove *i*, (which is formed in the press by the beads or rims *d e*,) and then simply knocking out the partition, such operation being facilitated by the boss *g*, which forms a point of resistance against premature fracture of the partition. The scoring of the groove *i* may be effected by a diamond, a revolving stone, a hardened-steel point, or by a simple iron ring provided with moist sand, as illustrated at Fig. 3. After the removal of partition *f* the more or less rough portion on the line of fracture is easily ground smooth, when the shade is finished. For such articles as do not require the blank to be further expanded, of course the blank may have the partition *f* removed at once.

I have shown the partition *f* as being located a short distance inside the lip *c*; but I do not limit the invention to any exact position, as in some cases the partition may be nearer the edge and in other cases still farther within the lip than I have shown. In the same manner I can produce a ring-top Argand shade such as shown at Fig. 5, in which the top is molded, as above, with a temporary partition inside, which is subsequently removed.

It is not new to thin down a portion of a glass article, and then break away the part not wanted in the finished product. Such has long been done in the manufacture of lamp-chimneys and similar articles. It has also been proposed to press tubular articles with an extra length, having a thinning-down groove at the line of finish, pressed circumferentially, so that the extra length can be afterward broken off and the fracture ground. My invention is essentially different, however, my object being to press the end and edge to finished form, and withal leave a point of attachment to the punty for reheating without marring the appearance or form of the edge already finished in the press. This can be done only by pressing a temporary bridge or partition within the edge. Such partition constitutes a point of attachment to a tool for reheating, and is broken away after the finishing of the other end is completed.

I claim as my invention—

1. The herein-described process of forming open-ended glassware, consisting in pressing the article with one end open and the other with a temporary diaphragm or partition within the end, then removing the partition, and grinding the inner surface of the article at the line of fracture, substantially as set forth.

2. The herein-described process of manufacturing open-ended glassware, consisting in pressing the article with one end open and the other with a temporary diaphragm or partition within the end, formed thinnest at its junction with the body of the article, then removing the partition, and grinding the inner surface of the article at the line of fracture, substantially as described.

3. In the manufacture of open-ended glassware, a pressed blank having a temporary diaphragm or partition, f, within the end, substantially as described, whereby, in reheating, the blank is supported.

4. In the manufacture of open-ended glassware, a pressed blank having a temporary diaphragm or partition, f, within the end, and a groove or grooves, i, at the junction of the partition with the body, substantially as described, whereby a weak point is presented for subsequent fracture and removal of the partition.

In testimony that I claim the foregoing as my own I have hereto affixed my signature in presence of two witnesses.

CHARLES CHALLINOR, JR.

Witnesses:
THOS. J. McTIGHE,
T. J. PATTERSON.